US008723922B2

(12) United States Patent  (10) Patent No.: US 8,723,922 B2
Berger  (45) Date of Patent: May 13, 2014

(54) SINGLE CAMERA DEVICE AND METHOD FOR 3D VIDEO IMAGING USING A REFRACTING LENS

(75) Inventor: Andrew M. Berger, Pearl River, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1062 days.

(21) Appl. No.: 12/320,310

(22) Filed: Jan. 23, 2009

(65) Prior Publication Data

US 2010/0188483 A1 Jul. 29, 2010

Related U.S. Application Data

(60) Provisional application No. 61/194,297, filed on Sep. 25, 2008.

(51) Int. Cl.
*H04N 13/02* (2006.01)

(52) U.S. Cl.
USPC ............... 348/46; 348/335; 348/E13.074

(58) Field of Classification Search
USPC ................................. 348/46, 335, E13.074
See application file for complete search history.

(56) References Cited

U.S. PATENT DOCUMENTS

| 5,117,255 | A * | 5/1992 | Shiraishi et al. ............... 355/53 |
| 5,784,038 | A * | 7/1998 | Irwin ............................... 345/88 |
| 5,953,546 | A * | 9/1999 | Okada et al. .................. 396/272 |
| 7,046,447 | B2 | 5/2006 | Raber |
| 7,133,608 | B1 * | 11/2006 | Nagata et al. ................ 396/374 |
| 7,557,832 | B2 * | 7/2009 | Lindenstruth et al. ... 348/208.99 |
| 7,706,071 | B2 * | 4/2010 | Tang ............................... 359/619 |
| 7,719,604 | B2 * | 5/2010 | Huang ............................ 348/345 |
| 2001/0026401 | A1 * | 10/2001 | Koiwai et al. ................. 359/699 |
| 2003/0058552 | A1 * | 3/2003 | Schreiner ....................... 359/824 |
| 2004/0027451 | A1 * | 2/2004 | Baker ............................. 348/46 |
| 2005/0083491 | A1 * | 4/2005 | Suzuki et al. ................... 353/70 |
| 2005/0190282 | A1 * | 9/2005 | Shibagami ..................... 348/335 |
| 2005/0212817 | A1 * | 9/2005 | Cannon et al. ................. 345/619 |

(Continued)

FOREIGN PATENT DOCUMENTS

JP 6078337 A2 3/1994

OTHER PUBLICATIONS

Wang, Rong, et al., "Analysis and Optimization of the Stereo-System with a Four-Mirror Adapter," Journal of the European Optical Society, published Sep. 30, 2008, vol. 3, pp. 0833, 1-7.

(Continued)

*Primary Examiner* — Alina N. Boutah
(74) *Attorney, Agent, or Firm* — Haverstock & Owens LLP

(57) ABSTRACT

An example embodiment of the present invention may include an apparatus that captures 3D images having a lens barrel, including a lens disposed at a first end of the lens barrel, an image capture element at the second end of the lens barrel, and a refracting lens positioned along the optical axis of the lens barrel. The image capture device may have an adjustable active region, the adjustable active region being a region capable of capturing an image that is smaller than the total image capture area of the image capture element. The image capture element may capture images continuously at a predetermined frame rate. The image capture element may change the adjustable active region and the set of positioning elements may be adapted to continuous change the position of the refracting lens among a series of predetermined positions at a rate corresponding to the predetermined frame rate.

23 Claims, 6 Drawing Sheets

(56) References Cited

U.S. PATENT DOCUMENTS

| | | | |
|---|---|---|---|
| 2005/0212946 A1* | 9/2005 | Mikami | 348/335 |
| 2007/0187571 A1* | 8/2007 | Ebe et al. | 250/201.2 |
| 2008/0100737 A1* | 5/2008 | Huang | 348/335 |
| 2008/0151042 A1* | 6/2008 | Wang | 348/49 |
| 2008/0187306 A1* | 8/2008 | Sugiura | 396/349 |
| 2008/0239135 A1* | 10/2008 | Tamura | 348/335 |
| 2008/0291549 A1* | 11/2008 | Yoshida et al. | 359/699 |
| 2009/0005661 A1* | 1/2009 | Ozawa et al. | 600/322 |
| 2009/0033751 A1* | 2/2009 | Hasuda | 348/208.99 |
| 2009/0041451 A1* | 2/2009 | Miyamoto | 396/493 |
| 2009/0123144 A1* | 5/2009 | Maezono | 396/327 |
| 2009/0185279 A1* | 7/2009 | Goto | 359/629 |
| 2010/0157103 A1* | 6/2010 | LeGall et al. | 348/240.1 |
| 2010/0188480 A1* | 7/2010 | Berger | 348/42 |
| 2010/0188483 A1* | 7/2010 | Berger | 348/46 |
| 2010/0261961 A1* | 10/2010 | Scott et al. | 600/111 |

OTHER PUBLICATIONS

Gao, Chunyu, et al., "A Refractive Camera for Acquiring Stereo and Super-Resolution Images," Proceedings of the 2006 IEEE Computer Society Conference, published Feb. 2008, pp. 2316-2323.

* cited by examiner

SINGLE CAMERA DEVICE AND METHOD FOR 3D VIDEO IMAGING USING A REFRACTING LENS

CROSS REFERENCE TO RELATED APPLICATIONS

This application claims priority to U.S. provisional application Ser. No. 61/194,297 filed on Sep. 25, 2008. This application is related to U.S. non-provisional application Ser. No. 12/320,309 titled "Single Camera Device and Method for 3D Video Imaging Using Refracting Lens Array" filed on Jan. 23, 2009 the entire contents of which are hereby incorporated by reference.

BACKGROUND OF THE INVENTION

1. Field of the Invention

This invention relates generally to three-dimensional (3D) imaging and more particularly to a device and method for capturing 3D images and video using a camera having a lens, refracting lens, and an image capture device having an adjustable active area.

2. Description of the Related Art

Non-contact three-dimensional cameras, or digitizers, generally fall into four categories: stereoscopic digitizers, silhouette digitizers, timing digitizers, and projected pattern digitizers.

Stereoscopic digitizers traditionally employ multiple two-dimensional (2D) cameras to produce multiple viewing angles to capture multiple images of the target object from different angles. A 2D camera is positioned at a known offset relative to other 2D cameras. Given the positions of each camera it is possible to provide a correlation algorithm the necessary variables to identify the three-dimensional location of objects in the images.

Stereoscopic digitizers attempt to mimic the visual and mental facilities of the eyes and brain to identify the location of object surfaces in 3D space. The eyes 20 and brain 25 work in conjunction to obtain a three-dimensional mental model of the target object 5 (FIG. 1). Each eye 20 captures its own view (10a and 10b) and the two separate images are processed by the brain 25. Each eye 20 has a slightly different placement, resulting in a different point of view and field of view 10a (left) and 10b (right) of the target object 5. As a result, each eye obtains a slightly different left image 15a and right image 15b of the target object 5. When the two images 15a and 15b arrive simultaneously in the back of the brain, they are united into one model, by matching up the similarities and adding in the small differences. Using the two images, 15a and 15b, the brain compares the right image 15a and left image 15b to identify the number and magnitude of the similarities between the images to correlate the relationship between the images. Using the correlation between the images, the brain creates a 3D model of the target object 5.

A minimum requirement for stereoscopic digitizers is the ability to obtain two images from two different points of view. FIG. 2 illustrates a conventional 3D stereoscopic camera setup. Conventionally, obtaining the minimum two images is done with two distinct 2D cameras setups 50a and 50b, each positioned at a pre-defined distance from one another. Each 2D camera setup 50 includes an image pickup device, such as a CCD 30 and lens 35 positioned along an optical axis 40. Each camera 50 is positioned to point to the same target object 45.

By using an algorithm to identify the similar surfaces in the image obtained from camera 50a and camera 50b, and given the pre-defined distance between the cameras 50, the algorithm computes the three-dimensional location of the surface of target object 45.

One problem with stereoscopic digitizers is that they are generally both bulky and expensive because they require the use of multiple 2D cameras. Furthermore, the performance of the 3D camera setup is dependent on the careful configuration and alignment of the 2D cameras. Any change in the distance between the cameras or the angle between the cameras can pose problems to the pattern recognition algorithm, forcing the re-calibration of the hardware and software for the changed positions.

SUMMARY OF THE INVENTION

The present invention provides SINGLE CAMERA DEVICE AND METHOD FOR 3D VIDEO IMAGING USING REFRACTING LENS.

An example embodiment of the present invention may include an apparatus that captures 3D images having a lens barrel. The lens barrel may include a lens disposed at a first end of the lens barrel, an image capture element at the second end of the lens barrel, and a refracting lens positioned along the optical axis of the lens barrel. The image capture device may have an adjustable active region, the adjustable active region being a region capable of capturing an image that is smaller than the total image capture area of the image capture element. The refracting lens may be mounted to a set of adjusting elements which may adjust the position of the edge of the refracting lens. The set of positioning elements may be configured to position the refracting lens such that light entering the lens barrel at a first angle, relative to the optical axis, is refracted to the adjustable active region at a first location on the image capture element. The image capture element may be configured to capture images continuously at a predetermined frame rate. Furthermore, the image capture element may change the location of the adjustable active region and the set of positioning elements may be adapted to continuous change the position of the refracting lens among a series of predetermined positions at a rate corresponding to the predetermined frame rate.

Another example embodiment of the present invention may include a method for capturing 3D images. The method may include passing light through a lens at a first end of a lens barrel, capturing the light at an adjustable active region of an image capture element at a second end of the lens barrel, positioning a refracting lens positioned along an optical axis of the lens barrel; the refracting lens being mounted to a set of positioning elements. The method may also include positioning the refracting lens such that light entering the lens barrel at a first angle, relative to the optical axis, is refracted by the refracting lens to the adjustable active region at a first location on the image capture element. The capturing step may include capturing images continuously at a predefined frame rate. Furthermore, the method may include continuously changing the position of the refracting lens to different positions from among a series of predetermined positions in a predefined order, and changing the location of the adjustable active region to a location to correlate with each of the series of predetermined positions in a predefined order at a rate corresponding to the frame rate of the imager.

The present invention can be embodied in various forms, including digital and non-digital image capturing devices and methods, robotic imaging devices, virtual simulations, and the like.

BRIEF DESCRIPTION OF THE DRAWINGS

These and other more detailed and specific features of the present invention are more fully disclosed in the following specification, reference being had to the accompanying drawings, in which.

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
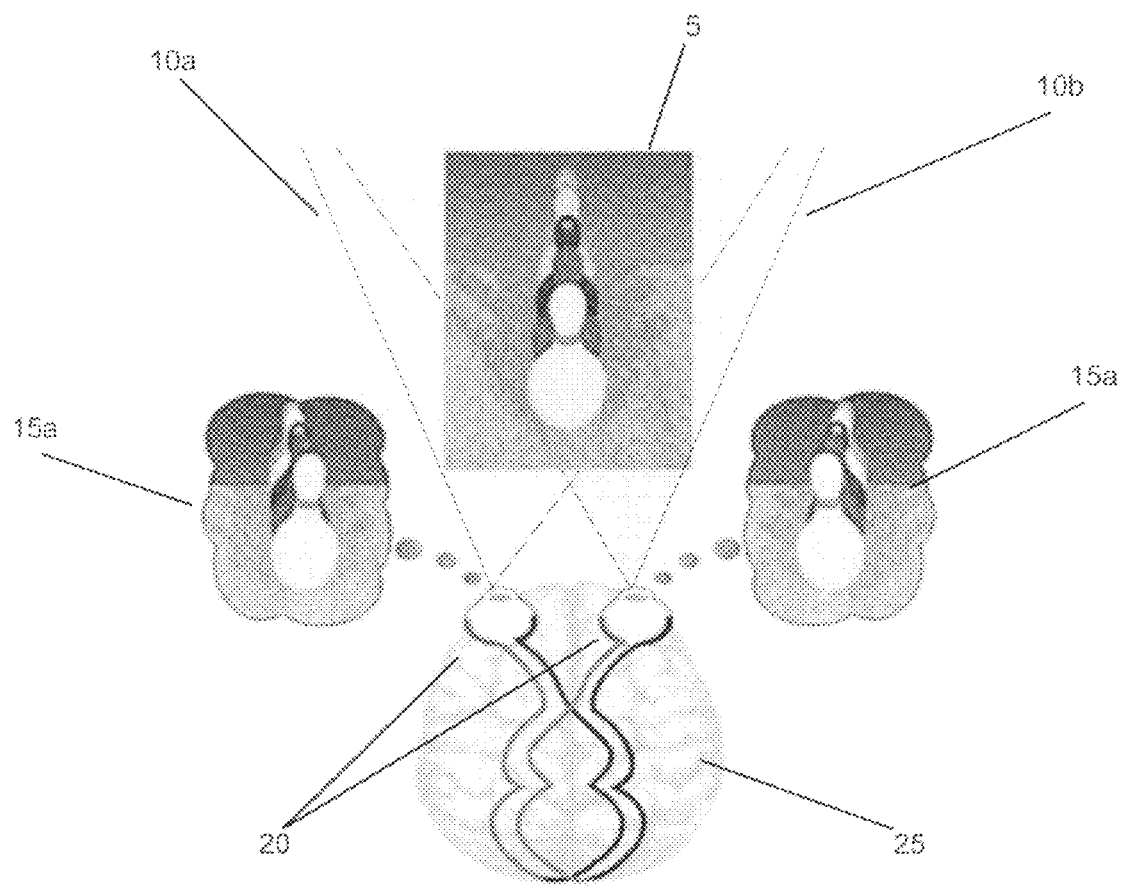
FIG. 1 is a diagram illustrating the basic principles of stereoscopy.
Figure 2:
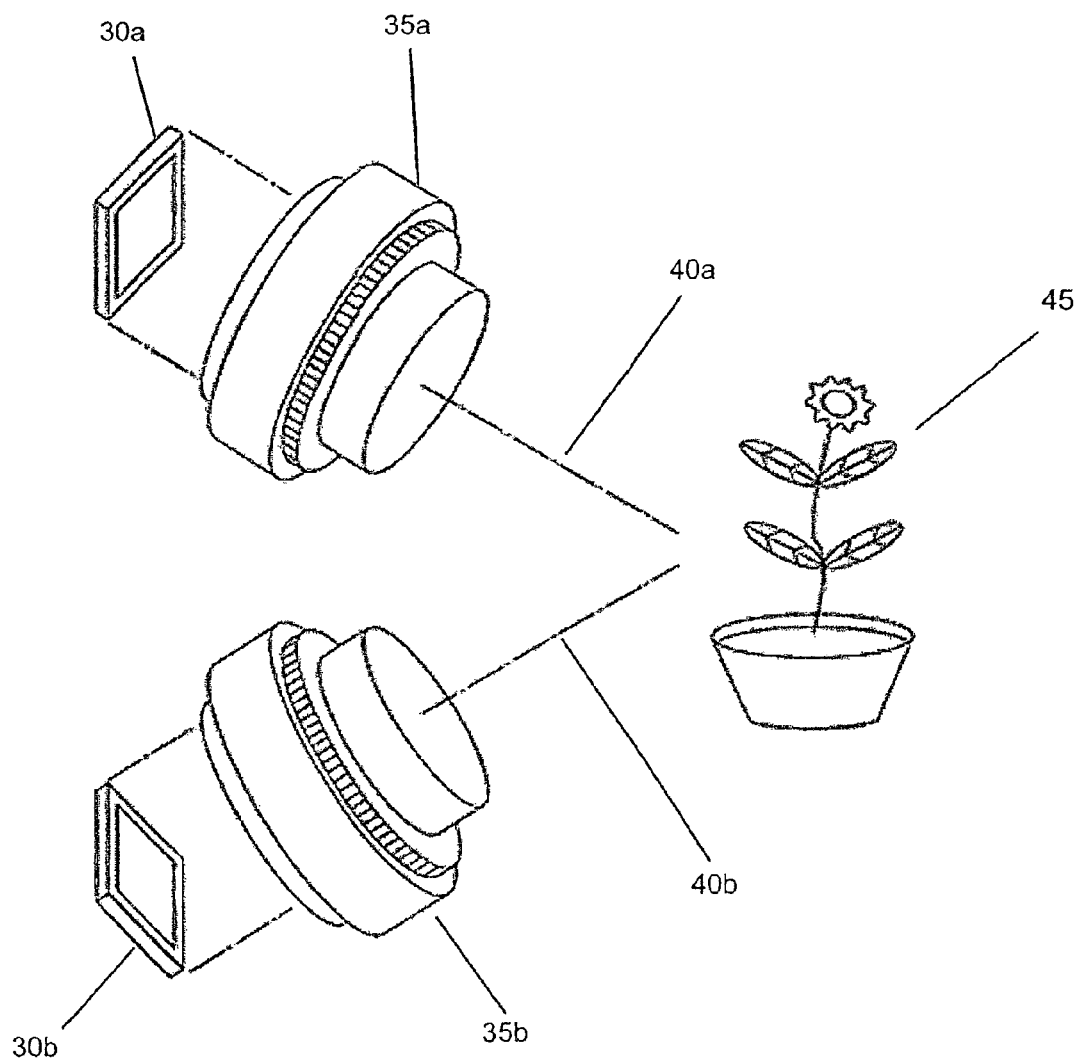
FIG. 2 is a diagram illustrating the conventional implementation of a stereoscopic camera.
Figure 3:
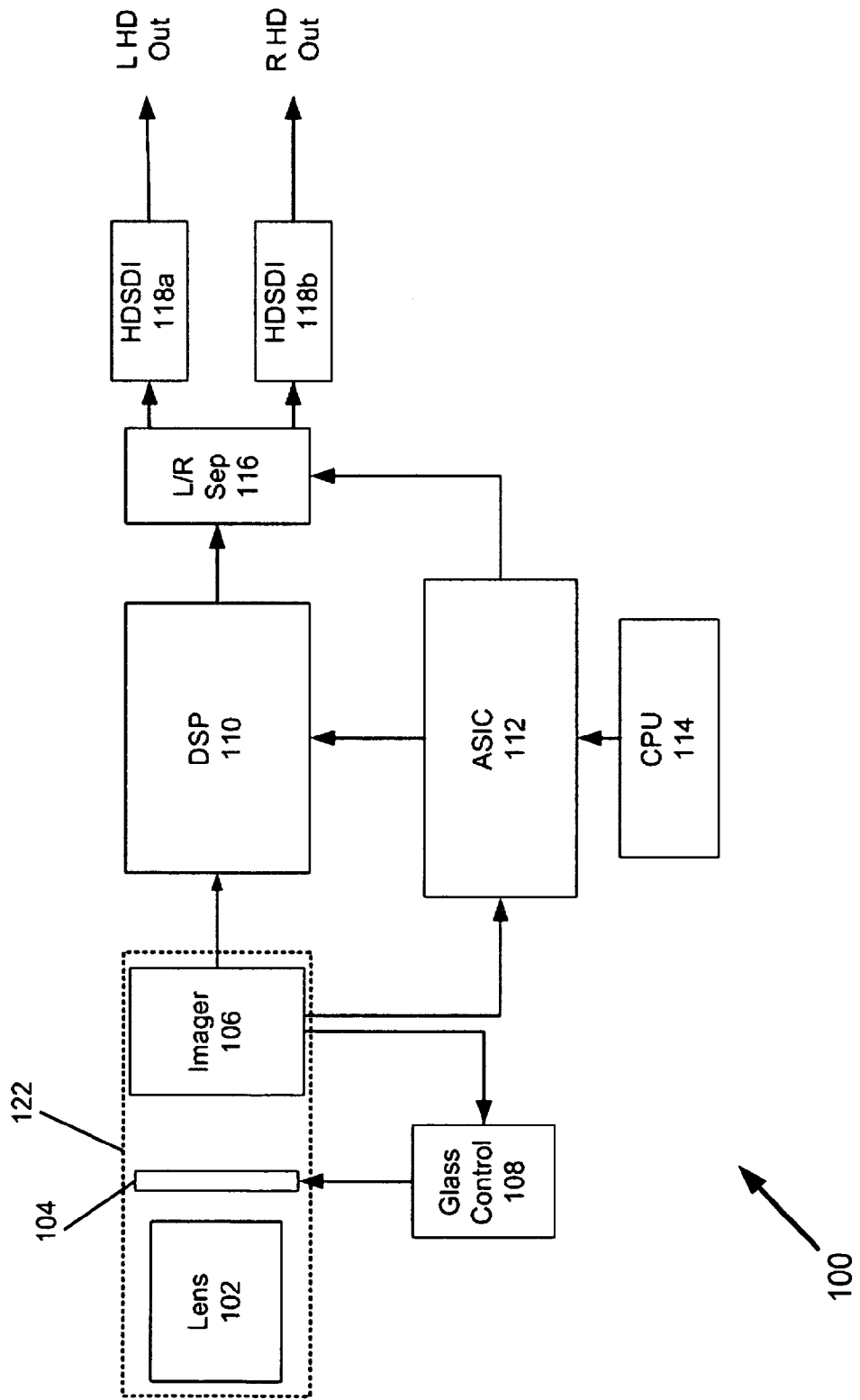
FIG. 3 is a diagram illustrating an example embodiment of the present invention.

FIG. 3 is a diagram illustrating an example embodiment of a 3D camera 100 in accordance with the present invention. Camera 100 may receive an image, via a light source, through lens barrel 122, which includes a lens 102, a refracting lens 104, and an imager 106.

Imager 106 may be an image capture device. Imager 106 may have an adjustable active region. The active region may be a sub-region of the entire imaging capture area of the imager 106. For example, if imager 106 is a CCD, only light information from pixels in the active region will contain readable imaging data. Alternatively, imager 106 may be a common CCD or CMOS, and the active region may be cropped from the image captured by imager 106, by a component of imager 106 or DSP 110. Alternatively, imager 106 may be an image pickup medium or a prism that deflects light at the end of the lens barrel 122 to an image pickup medium. Camera 100 may also include a CPU 114 for controlling Application-Specific Integrated Circuit (ASIC) 112, and thereby control DSP 110 and L/R separator 116.

An image captured by imager 106 may pass to digital signal processor (DSP) 110, which may convert the image into a digitally storable or transmittable format, such as a bitmap, jpeg, or other format appropriate for analysis. DSP 110 may be a conventional 2D type digital signal processor or a specialized processor for processing image data from imager 106. For example, DSP 110 may be specialized to identify the active region in the data from imager 106, and only process information in the active region.

Left/right image separator (L/R separator) 116 may de-multiplex the image data output from DSP 110 into two independent outputs which are provided to HDSDI encoders 118a and 118b. The outputs of HDSDI encoders 118a and 118b pass through an external interface of camera 100 to a recording medium or transmission medium.

By properly refracting incoming light using refracting lens 104 onto the active region of imager 106, camera 100 may capture two distinct images of a target object without using a plurality of lens barrels 122 or moving lens barrel 122. Camera 100 may quickly capture the two distinct images or record 3D video by operating the various components in a synchronized fashion. To capture 3D images or 3D video, camera 100 may operate imager 106, DSP 110, refracting lens controller 108, and L/R separator 116 at a uniform frequency. For example, imager 106 may operate at a frame rate of 60 frames per second (60 fps). This frame rate is provided to refracting lens controller 108, DSP 110, and L/R Separator 116. Imager 106 may also operate in conjunction with refracting lens controller 108 to identify the optimal placement of refracting lens 104 for the active region associated with each frame.

During capture, imager 106 may adjust the location of the active region in synchronization with the frame rate. Refracting lens controller 108 may continually re-align refracting lens 104 with the active region of the imager 106 at a rate corresponding to the frame rate of the imager 106, e.g., 60 adjustments per second, ensuring that each frame captured by imager 106 represents an alternate image, e.g., a left image and a right image. The output of imager 106 is processed by DSP 110. The output of the DSP 110 is de-multiplexed by L/R separator 116, which may use a time de-multiplexing technique or other technique, in synchronization with the refracting lens controller 108 and imager 106 to produce two independent outputs which are encoded by HDSDI encoders 118a and 118b. However, it will be understood that the frame rate may be dictated by the available hardware, particular implementation, and/or situational lighting.

While the example embodiment performs stereoscopy using a refracting lens 104 in conjunction with imager 106 to create two points of view, it is equally possible to perform stereoscopy using any number of refracting lenses or any number of viewing angles while remaining within the spirit of the present invention. For example, refracting lens 104 can alternate between 3, 4, or 5 aligned positions to obtain 3, 4, or 5 viewing angles by properly setting the active region of the imager 106. Refracting lens controller 108 only needs to be capable of aligning the refracting lens 104 to produce a different viewing angle in synchronization with the frame rate and imager 106.

Figure 4:
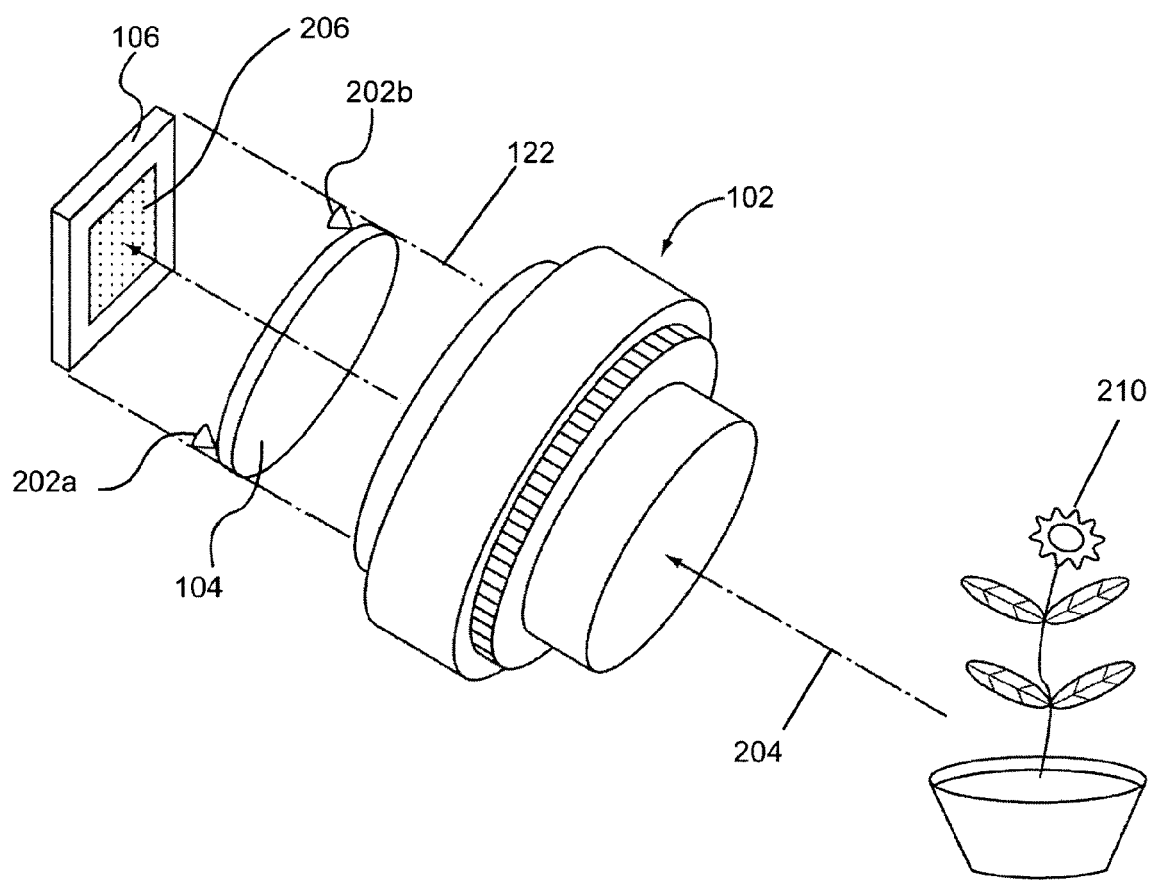
FIG. 4 is a diagram illustrating an example embodiment of the components of the lens barrel in accordance with the present invention.

FIG. 4 illustrates an example of a lens barrel 122, having optical axis 204, in accordance with the present invention.

Lens barrel 122 is directed towards target object 210. Lens barrel 122 includes lens 102, refracting lens 104, imager 106, and piezoelectric devices 202a-202b, positioned along optical axis 204. Piezoelectric devices 202a and 202b adjust the position of refracting lens 104.

Piezoelectric devices 202a and 202b are controlled by currents and voltages from refracting lens controller 108. Via piezoelectric devices 202a and 202b, refracting lens controller 108 may change the positions of refracting lens 104 in synchronization with the frame rate of imager 106.

Imager 106 may include a light sensitive surface. Active region 206 represents a sub-region of the light sensitive surface. For example, active region 206 may be a matrix of adjacent pixels on a CCD. Alternatively, the active region may be formed of any combination of pixels on imager 106 that may allow the lens barrel to change the point of view or field of view of the captured image. Alternatively, active region 206 may not represent a region on the imager 206, but may represent a region of the captured image output by imager 106 that is used for stereoscopic analysis of the resulting data produced by camera 100.

Lens 102 and refracting lens 104 may take many forms, and may be formed of various substances or polymers including, but not limited to, glass, liquids, gels, or plastics. Imager 106 may be or may be used in conjunction with a CCD, CMOS, or any alternative light capturing mechanism.

Computing devices such as those discussed herein generally, such as for example, CPU 114, ASIC 112, and DSP 110 may each include instructions executable by one or more processors. Computer-executable instructions may be compiled or interpreted from computer programs created using a variety of programming languages and/or technologies known to those skilled in the art, including, without limitation, and either alone or in combination, Java™, C, C++, Assembly, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

Similarly the output of imager 106, DSP 110, L/R separator 116, HDSDI 118a, and HDSDI 118b also produce output that may be stored on a computer readable medium or transmitted via a transmission medium.

A computer-readable medium includes any medium that participates in providing data (e.g., instructions or images), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 5A:
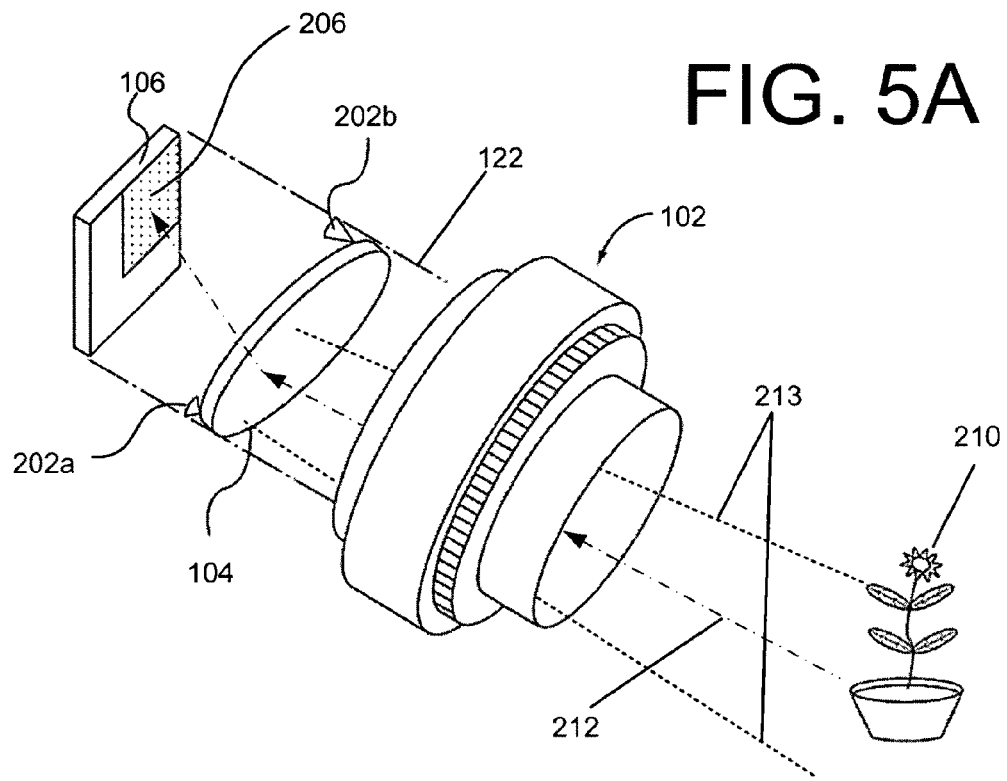
FIGS. 5A and 5B illustrate an application of the example embodiment of the components of the lens barrel with respect to distant objects in accordance with the present invention.
Figure 5B:
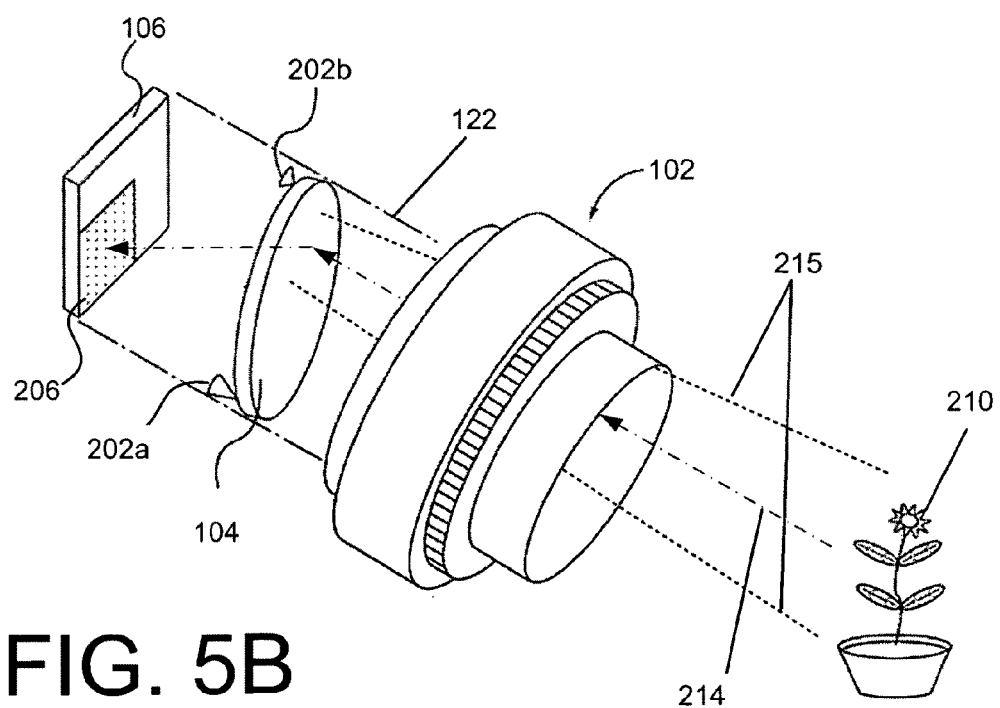

FIGS. 5A and 5B illustrate a lens barrel 122 during the stereoscopic imaging process. The lens barrel 122 is directed at a distant target object 210. By changing the position and alignment of refracting lens 104 in conjunction with the active region 206, camera 100 may capture two viewing angles of target object 210.

FIG. 5A shows light beam 212 coming from target object 210 into lens 102. Since target object 210 is distant, the light beam 212 from target object 210 is effectively parallel to the optical axis 204 of the lens barrel 122. In FIG. 5A, light beam 212 represents the center of the first (e.g., left) stereoscopic image captured by imager 106, and field of view 213 represents the range (e.g., width and/or height) of the captured image.

Light beam 212 is refracted by refracting lens 104 towards the center of active region 206 of imager 106. Since light beam 212 is initially offset from the optical axis 204 but is refracted to the center of active region 206 of the imager 106, the image captured by imager 106 will have a different point of view and field of view 213 than a non-refracted image.

FIG. 5B illustrates light beam 214 coming from target object 210 into lens 102. Since target object 210 is distant, the light beam 214 from target object 210 is effectively parallel to the optical axis 204 of the lens barrel 122. In FIG. 5B, light beam 214 represents the center of the second (e.g., right) stereoscopic image captured by imager 106, and field of view 215 represents the range (i.e., width or height) of the captured image.

Light beam 214 is refracted by refracting lens 104 towards the center of active region 206 of imager 106 Similar to FIG. 5A, light beam 214 is initially offset from the optical axis 204, but is refracted to the center of the active region 206 of imager 106, causing the image captured by imager 106 to have a different point of view and field of view 215 from a non-refracted image.

The refracting lens configuration of FIG. 5A may produce a different image than the refracting lens configuration of FIG. 5B because each configuration has a different point of view and different field of view, 213 and 215, respectively. Each field of view 213 and 215 gives the camera 100 a slightly different image range, and the different points of view expose the imager 106 to different angles of the target object 210. While with distant objects these distinctions may be subtle, the differences may be sufficient to identify the respective 3D locations of the surfaces of the target object 210.

During capture, lens barrel 122 may change configuration from FIG. 5A to FIG. 5B, and vice versa, at a frequency comparable to the frame rate of imager 106. For example if the imager 106 operates at a frequency of 60 images per second (60 fps) then lens barrel 122 must cycle between the configuration from FIG. 5A to the configuration of FIG. 5B within each 1/60 seconds. By continually changing the configuration, it is possible to obtain 3D video or images of target object 210 at a frame rate of $1/30^{th}$ of a second, i.e., 1 left and right image pair per 1/30 seconds.

The depth perception of the device may be improved by increasing the ratio between the distance between the points of view and the distance of lens barrel 122 to the target object 210. This can be accomplished by either moving the target object closer to lens 102 or increasing the radius of lens barrel 122, lens 102, and refracting lens 104. This increases the divergence between fields of view 213 and 215.

Figure 6A:
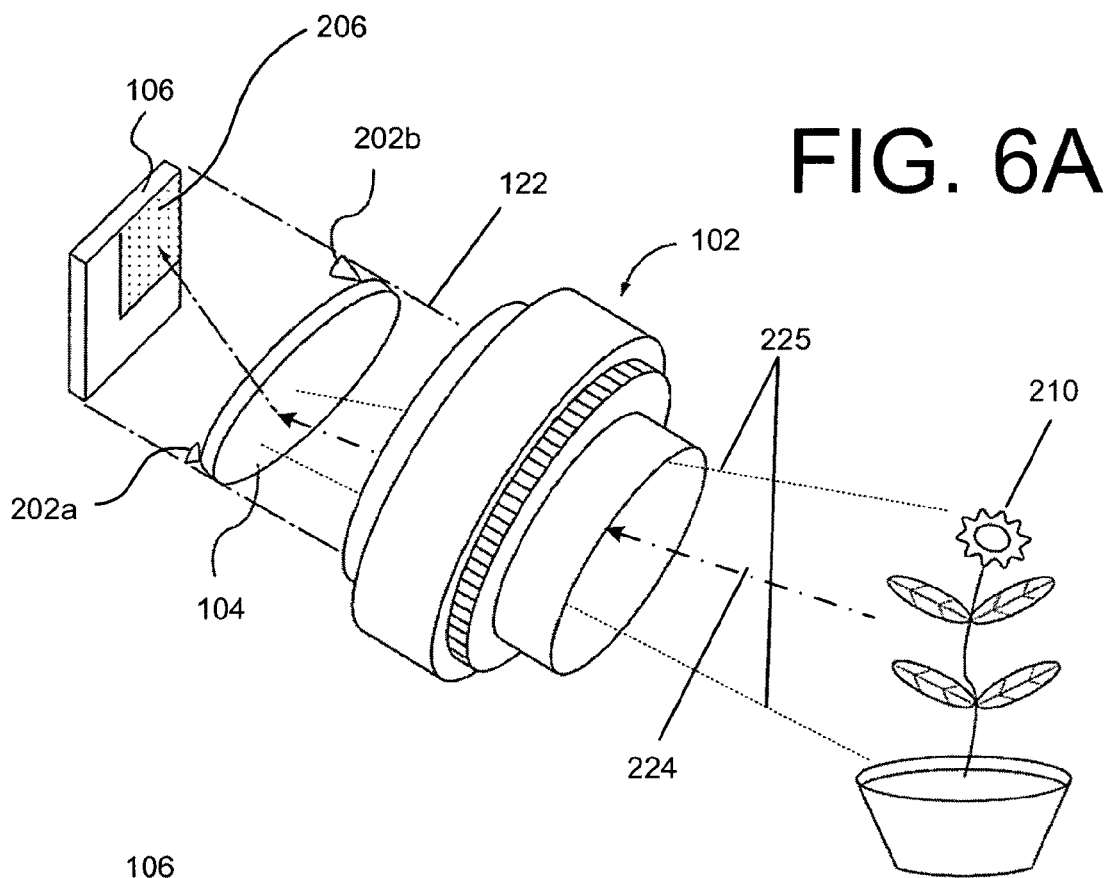
FIGS. 6A and 6B illustrate an application of the example embodiment of the components of the lens barrel with respect to near objects in accordance with the present invention.
Figure 6B:
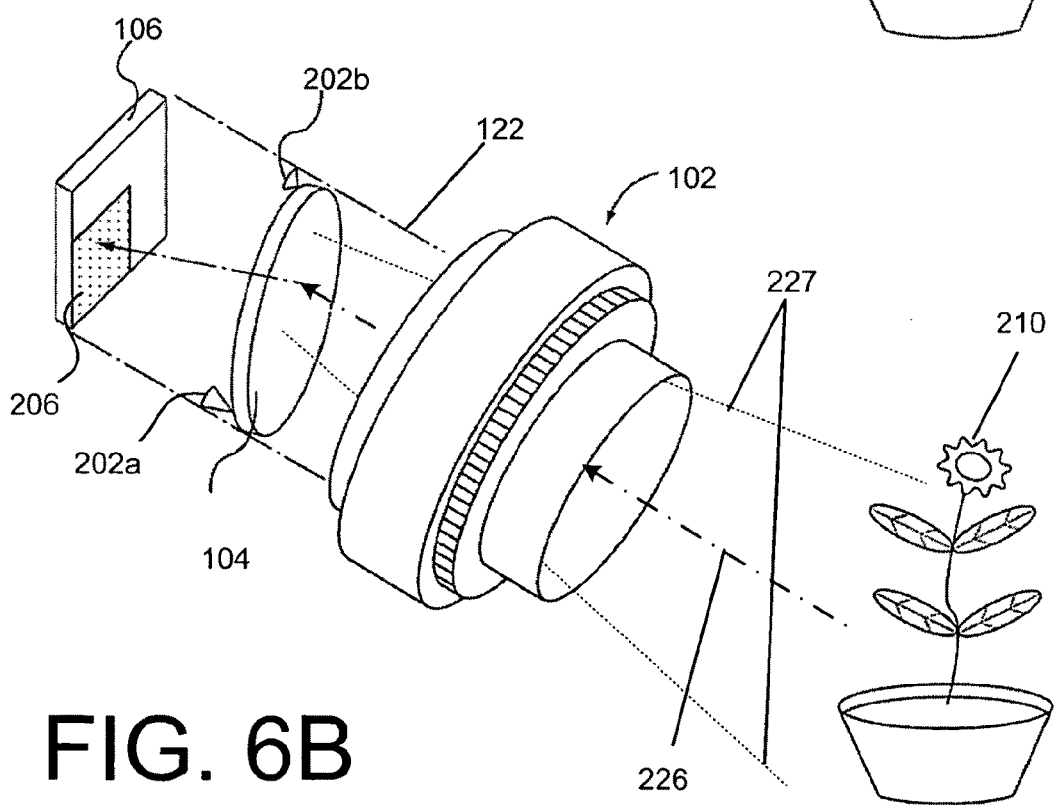

FIGS. 6A and 6B illustrate two configurations of a lens barrel 122 having the target object 210 closer to lens barrel 122, than in FIGS. 5A and 5B. Alternatively, FIGS. 6A and 6B could also illustrate a lens barrel 122 having a greater radius, as compared to FIGS. 5A and 5B.

FIG. 6A shows light beam 224 coming from target object 210 into lens 102. Since target object 210 is nearby, the light beam 224 from target object 210 is slanted relative to the optical axis 204. In FIG. 6A, light beam 224 represents the center of the first stereoscopic image captured by imager 106, and field of view 225 represents the range (i.e., width or height) of the captured image.

Similarly, FIG. 6B shows light beam 226 coming from target object 210 into lens 102. Since target object 210 is nearby, the light beam 226 from target object 210 is slanted relative to the optical axis 204. In FIG. 6B, light beam 226 represents the center of the second stereoscopic image captured by imager 106, and field of view 227 represents the range (i.e., width or height) of the captured image.

In both FIGS. 6A and 6B, refracting lens 104 is aligned so that light beams 224 and 226 are refracted by refracting lens 104 towards the center of active region 206 of imager 106. Since the arrangement in FIG. 6A has field of view 225 and FIG. 6B has field of view 227, which are offset from one another but are refracted to the center of active region 206, the images captured by imager 106 for each configuration will appear to be from different points of view. This provides greater differences in the resulting images and thereby may improve depth perception, compared to the configurations of FIGS. 5A and 5B.

While embodiments herein are discussed primarily with respect to a system embodiment, an apparatus embodiment, and a lens barrel configuration, the present invention is not limited thereto. For example, different various lens barrel 122 configurations and adjustment mechanisms may be employed in positioning the refracting lens 104.

For example, it may be possible to replace piezoelectric devices 202a and 202b with alternative mechanical or electrical devices. For example, an alternative embodiment may position the refracting lens at a static angle and rotate the lens barrel 122, or the refracting lens 104, at a rate corresponding to the frame rate of the imager 106. This would allow for the same result as switching between different lens barrel 122 configurations at a given frame rate. Alternatively, an implementation may use the piezoelectric devices in conjunction with another mechanical or electrical approach to achieve the necessary synchronized positioning of the refracting lens 104 in accordance with the frame rate of the imager 106.

Although embodiments of the invention are discussed primarily with respect to apparatuses for using a modified lens barrel and camera obtaining multiple images having different fields of view, and for obtaining three-dimensional images and video, other uses and features are possible. For example, an alternative embodiment may relate to a holographic projection device which can be formed by replacing imager 106 in lens barrel 122 with a projector LCD, thereby making it possible to alternatively project images onto a surface from two different points of view. Such dual or multiple projection-angle devices may create the appearance of a hologram on a target object. Various embodiments discussed herein are merely illustrative, and not restrictive, of the invention.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatuses, systems, assemblies, methods, components, materials, parts, and/or the like. In other instances, well-known structures, materials, or operations are not specifically shown or described in detail to avoid obscuring aspects of embodiments of the present invention. Thus embodiments of the present invention produce and provide SINGLE CAMERA DEVICE AND METHOD FOR 3D VIDEO IMAGING USING REFRACTING LENS. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. An apparatus for capturing 3D images including a lens barrel having a first end where light enters the lens barrel and a second end, comprising:
    a lens disposed at a first end of the lens barrel;
    an image capture element adapted to capture an image projected thereon at the second end of the lens barrel, having an adjustable active region, the adjustable active region being a region that captures an image that is smaller in area than the total image capture area of the image capture element;
    a refracting lens positioned along the optical axis of the lens barrel and disposed between the lens and the image capture element, the refracting lens being mounted to a set of adjusting elements, the set of adjusting elements for adjusting the position of the edge of the refracting lens,
    wherein, when the set of adjusting elements adjust the position of the edges of the refracting lens to a first position, a light beam from a target object, effectively parallel to the optical axis, is refracted by the refracting lens to the center of the active region so that the refracted light beam represents a first stereoscopic image captured by the image capture element and having a first point of view and a first field of view and, when the set of adjusting elements adjust the position of the edges of the refracting lens to a second position different from the first position, the light beam from the target object, effectively parallel to the optical axis, is refracted by the refracting lens to the center of the active region so that the refracted light beam represents a second stereoscopic image captured by the image capture element and having a second point of view different from the first point of view and a second field of view different from the first field of view with both the first and second points of view and the first and second fields of view being different from a non-refracted image.

2. The apparatus for capturing 3D images of claim 1, wherein the set of adjusting elements is configured to position the refracting lens such that light entering the lens barrel at a first angle, relative to the optical axis, is refracted by the refracting lens to the adjustable active region at a first location on the image capture element.

3. The apparatus for capturing 3D images of claim 2, wherein the set of adjusting elements is configured to position the refracting lens such that light entering the lens barrel at a second angle, relative to the optical axis, is refracted by the refracting lens to the adjustable active region at a second location on the image capture element.

4. The apparatus for capturing 3D images of claim 1, wherein the image capture element captures images continuously at a predetermined frame rate.

5. The apparatus for capturing 3D images of claim 4, wherein the set of adjusting elements are adapted to continuous change the position of the refracting lens to different positions from a series of predetermined positions in a predefined order; and the image capture element is adapted to change the location of the adjustable active region to correlate with each of the series of predetermined positions in a predefined order.

6. The apparatus for capturing 3D images of claim 4, wherein the set of adjusting elements are adapted to change the positions of the refracting lens and the image capture element is adapted to change the location of the adjustable active region at a rate corresponding to the predetermined frame rate.

7. The apparatus for capturing 3D images of claim 4, wherein the set of adjusting elements are adapted to hold the first refracting lens at a first predetermined angle relative to the optical axis; and
    the first set of adjusting elements are mounted a rotating element that rotates the refracting lens about the optical axis.

8. The apparatus for capturing 3D images of claim 7, wherein the rotating element rotates the refracting lens at a rate of revolution corresponding to time period that is a multiple of the predetermined frame rate.

9. The apparatus for capturing 3D images of claim 1, wherein the set of adjusting elements adjust the position of the refracting lens receive a current or voltage at a rate corresponding to the predetermined frame rate.

10. The apparatus for capturing 3D images of claim 1, wherein the set of adjusting elements are piezoelectric elements.

11. The apparatus for capturing 3D images of claim 1, wherein the first stereoscopic image partially occupies the image capture element and is disposed thereon in a first corner portion thereof and the second stereoscopic image partially occupies the image capture element and is disposed thereon in a second corner portion thereof being diametrical to the first corner portion.

12. A method for capturing 3D images, comprising:
    passing light through a lens at a first end of a lens barrel extending along and about an optical axis;
    capturing the light at an adjustable active region of an image capture element at a second end of the lens barrel, the image capture element disposed on and extending perpendicularly relative to the optical axis, the adjustable active region being a region that captures an image that is smaller in area than the total image capture area of the image capture element;
    positioning a refracting lens having a diametral centerline and positioned along an optical axis of the lens barrel between the lens and the image capture element, the refracting lens being mounted to a set of adjusting elements, the set of adjusting elements for adjusting the position of the edge of the refracting lens,
    wherein, when the set of adjusting elements adjust the position of the edges of the refracting lens to a first position, a light beam from a target object, effectively parallel to the optical axis, is refracted by the refracting lens to the center of the active region so that the refracted light beam represents a first stereoscopic image captured by the image capture element and having a first point of view and a first field of view and, when the set of adjusting elements adjust the position of the edges of the refracting lens to a second position different from the first position, the light beam from the target object, effectively parallel to the optical axis, is refracted by the refracting lens to the center of the active region so that the refracted light beam represents a second stereoscopic image captured by the image capture element and having a second point of view different from the first point of view and a second field of view different from the first field of view with both the first and second points of view and the first and second fields of view being different from a non-refracted image.

13. The method for capturing 3D images of claim 12 wherein the step of positioning the refracting lens includes positioning the refracting lens such that light entering the lens barrel at a first angle, relative to the optical axis, is refracted by the refracting lens to the adjustable active region at a first location on the image capture element.

14. The method for capturing 3D images of claim 13 wherein the step of positioning the first refracting further includes positioning the refracting lens such that light entering the lens barrel at a second angle, relative to the optical axis, is refracted by the refracting lens to the adjustable active region at a second location on the image capture element.

15. The method for capturing 3D images of claim 14 wherein the first location partially occupies the image capture element in a first corner portion thereof.

16. The method for capturing 3D images of claim 15 wherein the second location partially occupies the image capture element in a second corner portion thereof being diametrical to the first corner portion.

17. The method for capturing 3D images of claim 12 wherein the capturing step includes capturing images continuously at a predefined frame rate.

18. The method for capturing 3D images of claim 17 wherein
    the step of positioning the refracting lens includes continuously changing the position of the refracting lens to different positions from a series of predetermined positions in a predefined order; and
    the capturing step includes changing the location of the adjustable active region to a location to correlate with each of the series of predetermined positions in a predefined order.

19. The method for capturing 3D images of claim 18 wherein the set of adjusting elements and image capture element change the positions of the refracting lens and the image capture element changes the location of the adjustable active region at a rate corresponding to the predetermined frame rate.

20. The method for capturing 3D images of claim 17 wherein the set of adjusting elements hold the refracting lens at a predetermined angle relative to the optical axis; and
    further comprising pivoting the refracting lens about the optical axis.

21. The method for capturing 3D images of claim 20 wherein a rotating step includes pivoting the refracting lens at a rate of revolution corresponding to a multiple of the predetermined frame rate.

22. The method for capturing 3D images of claim 12 wherein the set of adjusting elements receive a current or voltage at a rate corresponding to the predetermined frame rate.

23. The method for capturing 3D images of claim 12 wherein the set of adjusting elements are piezoelectric elements.

* * * * *